(No Model.)
E. P. NOYES.
PLUG CALK FOR HORSESHOES.
No. 480,611. Patented Aug. 9, 1892.
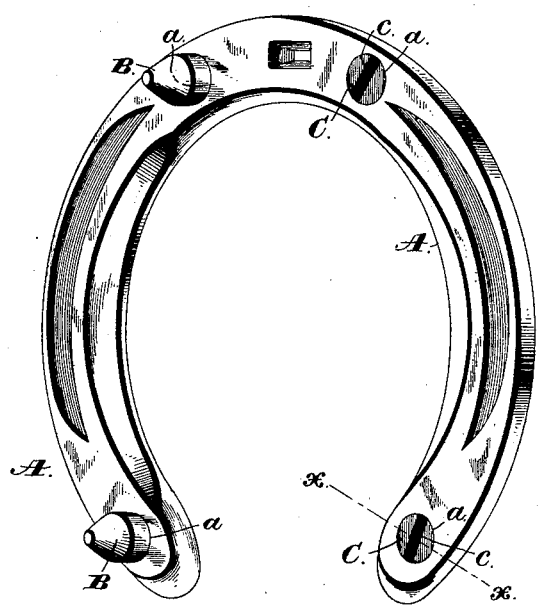
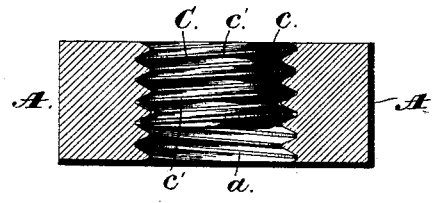
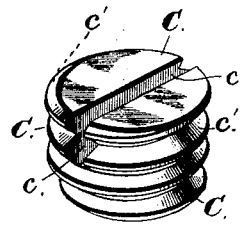
Witnesses:
Jas. E. Hutchinson
Henry C. Hazard
Inventor.
Edward P. Noyes
by Prindle and Russell
his Attorneys

UNITED STATES PATENT OFFICE.

EDWARD P. NOYES, OF BOSTON, MASSACHUSETTS.

PLUG-CALK FOR HORSESHOES.

SPECIFICATION forming part of Letters Patent No. 480,611, dated August 9, 1892.

Application filed September 2, 1887. Serial No. 248,599. (No model.)

*To all whom it may concern:*

Be it known that I, EDWARD P. NOYES, of Boston, in the county of Suffolk, and in the State of Massachusetts, have invented certain new and useful Improvements in Plug-Calks for Horseshoes; and I do hereby declare that the following is a full, clear, and exact description thereof, reference being had to the accompanying drawings, in which—

Figure 1 shows a perspective view of a horseshoe with some of the calks removed and my screw plug-calks inserted in place thereof; Fig. 2, a detail enlarged sectional view on line $x\ x$ of Fig. 1; Fig. 3, a detail enlarged view of one of the plug-calks.

Letters of like name and kind refer to like parts in each of the figures.

The object of my invention is to provide improvements in plug-calks for use with horseshoes; and to this end it consists in the plug-calk constructed and arranged as hereinafter specified and in the combination of the same with a horseshoe.

Where detachable or removable horseshoe-calks are used, it is necessary to provide some form of plugs, usually called "plug-calks," as distinguished from the long calks, to fill up the calk-receiving holes in the horseshoe when the calks are removed. Such plug-calks are needed to keep the calk-holes from being stopped up and the threads and edges of the holes from being jammed and injured during the use of the shoe.

The plug-calks as heretofore made and used have been found liable to become loose and work out or to work inward during use of the shoe, so as to leave the edges of the calk-holes and the outer portions of the threads within such holes exposed to injury. It has also been found that on account of the necessary variations in their size, caused by case-hardening, and on account of variations in the size of the holes tapped in the horseshoe, said plug-calks will not always fit the calk-holes as closely as desired. Where the long calks have been used for some time in the shoe, the tapped holes in the latter become stretched or enlarged at their outer or lower ends, so that the plug-calks heretofore made and used do not fit such lower ends of the holes closely enough to properly protect the hole edges and the threads at the lower ends of the holes and to keep dirt and grit from working into the screw-threads of the holes, so as to make the removal of the plug-calks most difficult. With these objections to the plug-calks as already made and used in view, I have invented a plug-calk which, in spite of the variations in its size, caused by case-hardening and in spite of variations in the size and shape of the tapped calk-holes in the horseshoe, shall always enter a calk-hole easily and screw down therein, so as to be nearly flush with the shoe, and which when so screwed down shall surely bind and lock itself against turning, but will be capable of being started back easily when it is to be removed.

In the drawings, A designates the body of a horseshoe, which can be of any desired form or construction. In it are tapped suitable holes—such as indicated at $a$—for the reception of threaded ends or projections on removable calks B B, which calks can be of any of the well-known forms of such devices. When such calks are removed, it becomes necessary to protect the holes from which they are taken against being filled up or clogged with dirt or stones and to keep the edges and threads of the holes from being jammed or otherwise injured during continued use of the shoe. For this purpose I have invented the plug-calk C in the form of a headless screw, with a slot $c$ in its end to be engaged by the end of a tool, such as an ordinary screw-driver.

In order to insure that the plug-calk shall enter and fit closely the opening $a$, notwithstanding variations in the size of the plug-calks from case-hardening and in the size of the calk-holes in the shoe, I make it tapering, as shown, from its slotted end. The thread $c'$ of the plug-calk runs out nearly or quite to nothing at the outer or slotted end of the calk, as shown in the drawings. This running out of the thread at its outer end causes the plug-calk to bind in the calk-opening $a$ when such calk has been screwed in until its outer slotted end is nearly flush with the shoe-surface. This binding effectually prevents the plug-calks from being turned one way or the other during use, while not preventing their being started back freely by the turn of a tool engaging the slot $c$. It will be observed that in the plug-calk as shown in the drawings the groove between the ribs of the thread, while running out or diminishing in depth toward its upper end, remains of substantially the same shape in cross-section, so as to engage closely the sides as well as the edges of the thread within the upper part of the threaded plug-receiving hole or opening.

For the best operation of my plug-calk in binding and being loosened again it is desirable that it be case-hardened; but I do not limit myself to calks so treated.

Having thus described my invention, what I claim is—

1. A device for use as a plug-calk, consisting of a plug made tapering or conical and provided with a thread which from a point near the outer larger end of the plug runs out or diminishes in depth as it approaches said end, substantially as and for the purpose specified.

2. In combination with the shoe having the threaded cylindrical opening, the plug-calk made tapering or conical and provided with a screw-thread which begins to diminish in depth from a point near its outer end on the larger end of the plug-calk, substantially as and for the purpose shown.

In testimony that I claim the foregoing I have hereunto set my hand this 23d day of June, 1887.

EDWARD P. NOYES.

Witnesses:
J. S. MILES,
W. S. McGOWAN, Jr.